United States Patent [19]

Akasaki et al.

[11] Patent Number: 5,219,943
[45] Date of Patent: Jun. 15, 1993

[54] PROCESS FOR PRODUCING MONODISPERSED VINYL POLYMER FINE PARTICLES

[75] Inventors: Yutaka Akasaki; Naoya Yabuuchi; Tatsuro Ohki, all of Kanagawa, Japan

[73] Assignee: Fuji Xerox Co., Ltd., Tokyo, Japan

[21] Appl. No.: 735,768

[22] Filed: Jul. 29, 1991

Related U.S. Application Data

[63] Continuation of Ser. No. 452,591, Dec. 19, 1989, abandoned, which is a continuation of Ser. No. 152,003, Feb. 3, 1988, Pat. No. 4,935,469.

[30] Foreign Application Priority Data

Feb. 4, 1987 [JP] Japan .................. 62-22530
Feb. 4, 1987 [JP] Japan .................. 62-22532
Feb. 4, 1987 [JP] Japan .................. 62-22533

[51] Int. Cl.$^5$ .................. C08F 2/26; C08F 4/40
[52] U.S. Cl. .................. 525/273; 525/253; 525/261; 525/262; 525/263; 525/267; 525/288; 525/292; 525/293; 525/308; 525/309; 526/214; 526/909; 526/80
[58] Field of Search ............ 526/214, 909, 80; 525/243, 261, 262, 253, 263, 267, 273, 288, 308, 309

[56] References Cited

U.S. PATENT DOCUMENTS

| | | | |
|---|---|---|---|
| 3,296,170 | 1/1967 | Burkhart et al. | 526/214 X |
| 3,449,293 | 6/1969 | Burzynski et al. | 528/26 X |
| 3,575,910 | 4/1971 | Thomas | 528/41 X |
| 3,652,497 | 3/1972 | Junas et al. | 260/47 |
| 4,138,380 | 2/1979 | Barabas et al. | 526/214 X |
| 4,935,469 | 6/1990 | Akasaki et al. | 525/243 |

FOREIGN PATENT DOCUMENTS 190886 8/1986 European Pat. Off. ............ 526/202
2218351 9/1974 France.

*Primary Examiner*—Fred Teskin
*Attorney, Agent, or Firm*—Finnegan, Henderson, Farabow, Garrett & Dunner

[57] ABSTRACT

A process for producing monodispersed fine particles of a vinyl polymer is disclosed, which comprises polymerizing monomers containing at least one vinyl monomer selected from the group consisting of aromatic vinyl compounds, acrylic esters, and a methacrylic ester in the presence of (1) a surface active agent represented by formula (I)

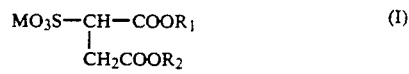

wherein $R_1$ and $R_2$, which may be the same or different, each represents a substituted or unsubstituted alkyl group having from 4 to 8 carbon atoms, a substituted or unsubstituted phenyl group, or a substituted or unsubstituted cyclohexyl group and M represents an alkali metal, (2) from $10^{-3}$ to $10^{-1}$ mol/l of a persulfate as a polymerization initiator, and (3) from $10^{-4}$ to $10^{-2}$ mol/l of a divalent metal sulfate as an electrolyte. Monodispersed vinyl polymer fine particles having a particle size of 1 μm or greater with a very narrow size distribution are obtained.

22 Claims, No Drawings

PROCESS FOR PRODUCING MONODISPERSED VINYL POLYMER FINE PARTICLES

This application is a continuation of application Ser. No. 07/452,591 filed Dec. 19, 1989, which is now abandoned, which is a continuation of application Ser. No. 07/152,003, filed Feb. 3, 1988, which is now U.S. Pat. No. 4,935,469.

FIELD OF THE INVENTION

This invention relates to a process for producing monodispersed fine particles of a vinyl polymer, and more particularly to a process for producing monodispersed vinyl polymer fine particles having a relatively large particle size and a narrow size distribution.

BACKGROUND OF THE INVENTION

Known processes for producing polymer latices of spherical particles include emulsion polymerization and suspension polymerization. In general, the emulsion polymerization technique is able to produce monodispersed polymer latices having a narrow size distribution by properly selecting conditions, but the particles have a maximum particle diameter of about 0.5 $\mu$m. It is known that the particle size of polymer particles obtained by emulsion Polymerization can be increased by (1) decreasing the amount of an emulsifier, (2) decreasing the amount of a polymerization initiator, or (3) adding an inorganic electrolyte. However, these techniques are disadvantageous in that emulsion polymerization stability is reduced and that the resulting polymer particles, though having an increased size, would be polydispersed.

In order to overcome these disadvantages, it has been proposed to control the concentration of the inorganic electrolyte as disclosed in Japanese Patent Application (OPI) No. 22904/84 (the term "OPI" as used herein refers to a "published unexamined Japanese patent application") or to use a solvent in combination with water in the production of a styrene-acrylamide copolymer latex as taught in *Kobunshi Gakkai Yokoshu*, Vol. 34, No. 2, 148 (1985).

However, the method of controlling the concentration of the inorganic electrolyte failed to obtain polymer particles of 1 $\mu$m or greater. The method of using a combination of a solvent and water succeeded in obtaining a styreneacrylamide copolymer latex having a particle size of 1 $\mu$m or greater but is inapplicable to polymerization of monomers other than styrene and acrylamide, proving unfit for a wide variety of uses.

On the other hand, according to the suspension polymerization technique, polymer particles having a broad range of size of from several micrometers to several millimeters can be produced, but it is impossible to obtain particles of uniform size.

It has also been proposed to obtain a monodispersed polymer by seed polymerization as described in Japanese Patent Application (OPI) No. 106554/83. This process comprises preparing fine polymer particles having a particle size of about 0.5 $\mu$m by emulsion polymerization and then allowing the fine particles to grow.

Since the aforesaid seed polymerization starts with an emulsion-polymerized latex having a particle size of about 0.5 $\mu$m, two or more steps of seed growth would be required to reach a particle size of from 5 to 10 $\mu$m. This increase in the number of steps required makes the production facilities more complicated and increases costs. Further, solution polymerization in a heterogeneous system (hereinafter referred to as "solution system dispersion polymerization") is known as proposed in *J. Polym. Sci. Polym. Lett.*, Ed., Vol. 23, 103–108 (1985), in which a one-step polymerization is carried out in a solvent capable of dissolving a monomer(s) but incapable of dissolving the resulting polymer to thereby obtain monodispersed fine polymer particles of micrometer size.

Utilizing the solution system dispersion polymerization method, polymer particles having a maximum size of about 10 $\mu$m with a narrow size distribution can be produced. However, the size distribution is subject to great variation with changes of polymerization conditions, such as the polymerization temperature, the amount of polymerization initiator, and the like. Such a polymer latex is particularly unsuitable for use in the field, needing control of rheological behavior, such as an electrophotographic toner. The use of a solvent gives rise to a safety problem as well as the necessity for additional equipment for recovery of the solvent, etc.

SUMMARY OF THE INVENTION

In light of the above-mentioned circumstances, the inventors have made extensive investigations of a process for producing fine polymer particles having a particle size of 1 $\mu$m or greater with a very narrow size distribution.

Accordingly, one object of this invention is to provide a process for producing monodispersed fine vinyl polymer particles having a large size and a very narrow size distribution.

Another object of this invention is to provide a process for producing fine polymer particles without a rigid limitation on the kind of monomers to be polymerized.

A further object of this invention is to provide a process for producing monodispersed fine vinyl polymer particles having a particle size of from 2 to 50 $\mu$m through simple production steps with good economy.

The inventors have considered the importance of a surface active agent to be used in the emulsion polymerization, as well as other factors, such as, for example, the kind and concentration of a polymerization initiator and an electrolyte in achieving a large particle size and a monodispersed system. As a result, it has now been found that fine vinyl polymer particles having a number average particle size (hereafter merely referred to as "particle size") of from 1.0 to 10.0 $\mu$m with a very narrow size distribution can be obtained by effecting emulsion polymerization of a vinyl monomer in the presence of a specific surface active agent represented by formula (I) shown below under specific polymerization conditions.

It has been furthermore found that monodispersed vinyl polymer particles having a particle size of from 2.0 to 50.0 $\mu$m can be obtained by allowing the above-prepared fine polymer particles to grow by seed polymerization.

In accordance with the present invention there is provided a process for producing monodispersed fine particles of a vinyl polymer, which process comprises polymerizing monomers containing at least one vinyl monomer selected from the group consisting of aromatic vinyl compounds, acrylic esters, and methacrylic esters in the presence of (1) a compound represented by formula (I)

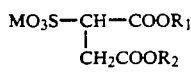

wherein $R_1$ and $R_2$, which may be the same or different, each represents a substituted or unsubstituted alkyl group having from 4 to 8 carbon atoms, a substituted or unsubstituted phenyl group, or a substituted or unsubstituted cyclohexyl group and M represents an alkali metal (e.g., Na, K, etc.), (2) from $10^{-3}$ to $10^{-1}$ mol/l of a persulfate as a polymerization initiator, and (3) from $10^{-4}$ to $10^{-2}$ mol/l of divalent metal sulfate as an electrolyte.

DETAILED DESCRIPTION OF THE INVENTION

The vinyl monomer or monomers which can be emulsion polymerized in the present invention is or are selected from the group consisting of aromatic vinyl compounds, e.g., styrene; acrylic esters; and methacrylic esters Examples of the vinyl monomer include styrenes such as styrene, α-methylstyrene, p-methylstyrene, p-tert-butylstyrene, p-methoxystyrene, p-phenylstyrene and 3,4-dichlorostyrene, and acrylic or methacrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate.

The emulsion stability of the polymerization system can be ensured by combining the aforesaid vinyl monomer(s) with a silicon-containing vinyl compound. The silicon-containing vinyl monomer which can be copolymerized with the vinyl monomers includes, for example, compounds represented by formula (II)

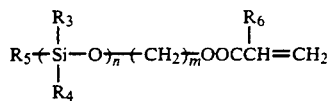

and compounds represented by formula (III)

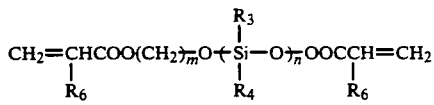

wherein $R_3$, $R_4$ and $R_5$ each represents a hydrogen atom, an alkyl group having from 1 to 8 carbon atoms, or a phenyl group; $R_6$ represents a hydrogen atom or a methyl group; and m and n each represents an integer of from 1 to 10.

These silicon-containing vinyl monomers function to improve emulsion retention owing to their low surface tension. The amount of the silicon-containing vinyl monomer to be used preferably ranges from 0.1 to 40% by weight, more preferably from 0.5 to 20% by weight, based on the total weight of he aforesaid vinyl monomer(s) and the silicon-containing vinyl compound If it is less than 0.1% by weight, the effect of improving emulsion stability during emulsion polymerization cannot be expected If it exceeds 40% by weight the resulting copolymer no longer exhibits satisfactory properties.

If desired, these vinyl monomers may further be combined with a small amount of other comonomers, such as acrylonitrile, methacrylonitrile, etc., which generally ranges from 0 to 30% by weight and preferably from 0 to 20% by weight based on the total weight of monomers.

The emulsion polymerization may be carried out either in one step or in two steps. For example, styrene is first homopolymerized and, subsequently, styrene and a silicon-containing vinyl monomer are added to the system to continue the polymerization reaction. When using a hydrophilic monomer, such as methyl methacrylate; the styrene or 2-ethylhexyl acrylate, etc. are first polymerized until a particle size/potential (surface charge density) balance attains equilibrium wherein the particles do not agglomerate and are stably dispersed in the system, and methyl methacrylate and a silicon-containing vinyl monomer are then added to the system to effect further polymerization.

The total amount of the monomers to be polymerized in the present invention generally ranges from 10 to 600 g/l, preferably from 100 to 400 g/l, as an aqueous solution concentration.

The emulsion polymerization reaction of the present invention is carried out in the presence of the compound represented by formula (I) as a surface active agent. Specific examples of the compound of formula (I) are shown below:

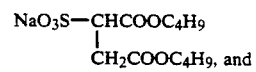

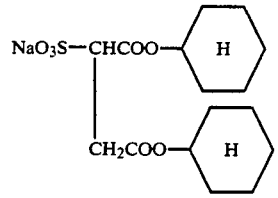

The amount of the compound of formula (I) to be added is arbitrarily selected and preferably ranges from 0.01 to 0.80 g/dl, more preferably from 0.01 to 0.1 g/dl as an aqueous solution concentration.

In general, a surface active agent to be used in emulsion polymerization with the purpose of increasing the polymer particle size while keeping a monodispersed system should 1) maintain a higher surface tension than commonly employed surface active agents such as sodium dodecylsulfate; 2) minimize repetition of emulsion formation and emulsion disappearance; and 3) maintain a sufficient surface charge. High surface tension inhibits the production of excessively fine particles, i.e., formation of a polydispersed system, resulting in increase of the polymer particle size. Maintaining a sufficient surface charge inhibits the production of coarse particles, i.e., formation of a polydispersed system, by preventing aggregation of particles. The surface active agents of formula (I) according to the present invention provide the above three conditions. In other words, they maintain a higher surface tension than commonly employed surface active agents, tend to cause less repetition of emulsion formation-emulsion disappearance as compared with conventionally employed linear surface active agents, such as sodium dodecylsulfate, and maintain a sufficient surface charge. In formula (I), limitation of the carbon atom number of the alkyl group as represented by $R_1$ or $R_2$ to a range of from 4 to 8 is preferred to achieve a balance of particle size and surface potential.

The polymerization initiator to be used in the present invention is selected from persulfate initiators, preferably potassium persulfate and ammonium persulfate. The persulfate initiator should be used as a concentration ranging from $10^{-3}$ to $10^{-1}$ mol/l, preferably from 0.01 to 0.08 mol/l in an aqueous solution At concentrations outside this range, monodispersed fine polymers of the vinyl polymer having the prescribed particle size and standard deviation cannot be obtained.

The electrolyte to be used in the present invention is selected from sulfates of divalent metals, such as cupric sulfate ($CuSO_4$), ferrous sulfate ($FeSO_4$), nickel sulfate ($NiSO_4$), cobalt sulfate ($CoSO_4$), chromium sulfate ($CrSO_4$), calcium sulfate ($CaSO_4$), manganese sulfate ($MnSO_4$), magnesium sulfate ($MgSO_4$), and beryllium sulfate ($BeSO_4$), with cupric sulfate and ferrous sulfate being preferred. By the use of the divalent metal sulfate, the size distribution curve of the resulting polymer particles becomes sharper as the average particle size increases. The electrolyte should be used at a concentration ranging from $10^{-4}$ to $10^{-2}$ mol/l, preferably from $10^{-4}$ to $10^{-3}$ mol/l, in an aqueous solution. At concentrations outside this range, monodispersed fine polymers of the vinyl polymer having the prescribed particle size and standard variation cannot be obtained.

The emulsion polymerization may be conducted in the presence of a water-soluble high polymer, e.g., an acrylic acid-maleic acid copolymer, etc., as a dispersion stabilizer in combination with the above-described surface active agent of formula (I). The amount of the water-soluble high polymer is generally from $10^{-2}$ to $10^{-1}$ g/dl as an aqueous solution concentration. The water-soluble high polymer preferably has a surface tension between 40 dyn/cm and 75 dyn/cm as measured in 0.1 wt % aqueous solution by means of a du Nuy's tensiometer.

The emulsion polymerization is carried out at a temperature ranging from 40° C. to 90° C., and preferably from 45° C. to 75° C.

The monodispersed latex produced is purified by ultrafiltration, dialysis, or like means to remove any remaining polymerization initiator, surface active agents, and the like. According to the above-described process, monodispersed fine particles having a number average particle size ranging from 1.0 to 10.0 μm and a size distribution with a number-based standard deviation (herein merely referred to as "standard deviation") of not more than 1.25, as determined by means of a Coulter counter, can be obtained.

When monodispersed polymer particles having a number average particle size ranging from 2.0 to 50.0 μm are desired, the above-obtained polymer particles having a number average particle size ranging from 1.0 to 10.0 μm can be used as seed particles to grow by seed polymerization. In the following description, the above-described process for producing monodisperse polymer particles having a number average particle size ranging from 1.0 to 10.0 μm will be referred to as "first step", and the subsequent seed polymerization will be referred to as "second step".

In carrying out the second step, a polymerization initiator is impregnated into the seed particles. Impregnation can be achieved, for example, by adding a solution of an oil-soluble polymerization initiator in a vinyl monomer described above to an aqueous solution of an appropriate surface active agent to form an emulsion. A latex containing the seed particles obtained by the first step is then added to the emulsion whereby the polymerization initiator and the vinyl monomer are impregnated into the seed particles through the aqueous phase. In carrying out the impregnation, it is preferable to adjust the number average molecular weight of the seed particles not to exceed 50,000, more preferably not to exceed 30,000, and even more preferably not to exceed 10,000, so that the seed particles may be readily swollen with the vinyl monomer.

The polymerization initiator to be used in the second step should be selected from those which do not decompose or decompose at a negligibly low rate during impregnation. More specifically, the polymerization initiator preferably has a decomposition temperature, at which it is reduced to half over a period of 10 hours, ranging between 55° C. to 90° C. If such a decomposition temperature is lower than 55° C., the vinyl monomer cannot be inhibited from polymerization in the course of impregnation. On the other hand, if the temperature is higher than 90° C., the reaction temperature in the subsequent polymerization should be increased accordingly. Among the polymerization initiators meeting the above-described criterion, the most preferred and the most common are lauroyl peroxide, m-toluoyl peroxide, trimethylhexanoyl peroxide, and benzoyl peroxide.

These polymerization initiators are used in an amount ranging from 0.001 to 10 parts by weight, preferably ranging from 0.01 to 5 parts by weight, per 100 parts by weight of vinyl monomers to be used.

The impregnation operation is usually performed at a temperature ranging from room temperature to 40° C. for a period ranging from 5 to 20 hours.

In order to assure dispersion stability during the impregnation operation, an appropriate surface active agent and dispersion stabilizer is added to the system. The surface active agent to be used preferably has a surface tension as small as possible, e.g., not more than 35 dyn/cm as measured in a 0.1 wt% aqueous solution by means of a du Nuy's tensiometer. Such a surface active agent includes compounds represented by formulae (IV) and (V)

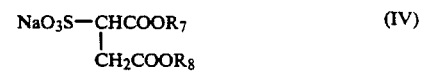

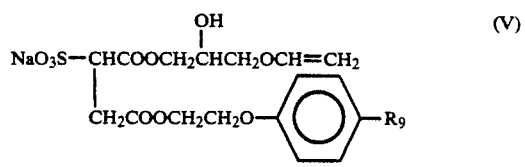

wherein $R_7$, $R_8$, and $R_9$ each represents an alkyl group having from 9 to 20 carbon atoms and preferably from 12 to 18 carbon atoms.

The amount of the surface active agent is generally from 0.01 to 1.0 g/dl, preferably from 0.01 to 0.1 g/dl, as an aqueous solution concentration.

A specific example of these surface active agents is a compound represented by the formula

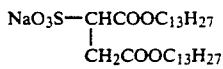

The use of a surface active agent having such a low surface tension makes it possible to prevent transfer of the polymerization initiator and vinyl monomer from the swollen seed particles to the aqueous phase to thereby suppress the formation of too fine particles.

The dispersion stabilizer to be used should have appropriate adsorbability and diffusibility in water in order to prevent aggregation among polymer particles. Any of known dispersion stabilizers, such as hydroxyethyl cellulose, polyvinyl alcohol, gelatin, potassium tertiary phosphate, etc., may be employed It is preferable, inter alia, to use polyvinyl alcohol, and more preferably polyvinyl alcohol having a degree of polymerization ranging from 100 to 900 and a degree of saponification ranging from 80 to 95 mol %. The degree of saponification is calculated from the following equation $$\text{Degree of Saponification} = \frac{m}{m + l} \times 100 \, (\%)$$

wherein m and l are the numbers (moles) of hydroxy group and acetyl group, respectively, contained in the polyvinyl alcohol. The amount of the dispersion stabilizer is generally from 0.01 to 1.0 g/dl, preferably from 0.1 to 0.8 g/dl as an aqueous solution concentration.

After impregnation of the polymerization initiator is completed, fresh vinyl monomer is added to the system. The vinyl monomer to be used here may include an aromatic vinyl compound and an acrylic or methacrylic ester as described above, and a vinyl cyanide compound (e.g., acrylonitrile), a conjugated diolefin (e.g., butadiene), or the like may also be used.

These vinyl monomers may be added in the form of the compound as such, but are preferably added in the form of an aqueous emulsion. If desired, the aqueous emulsion may contain the aforesaid surface active agent and/or dispersion stabilizer for the first step.

The seed polymerization is carried out in an aqueous emulsion phase at a temperature ranging from 50° C. to 95° C. The resulting latex comprises monodispersed polymer particles having a number average particle size ranging from 2.0 to 50.0 μm and a size distribution with a standard deviation of not more than 1.25 as measured by means of a Coulter counter, the particles having a core-shell structure composed of a seed particle formed by the first step and an outer layer of a vinyl polymer formed by the second step.

In the aforesaid seed polymerization, it is possible to obtain a porous polymer by using an appropriate polyfunctional vinyl monomer, preferably divinylbenzene. The polyfunctional vinyl monomer, if used, is added to the polymerization system together with an appropriate solvent at the time of seed growth. After completion of the polymerization, the solvent is removed to form pores.

In the instance where the present invention is applied to the preparation of an electrophotographic developer, a coloring agent may be used to impart color to the polymer latex of the invention. Coloring can be accomplished, for example, by 1) a method comprising allowing the seed particles to grow in the presence of an oil-soluble dye which is soluble in the vinyl monomer use, 2) a method comprising coating the seed particles with a pigment, e.g., carbon black, and then allowing the seed particles to grow, 3) a method comprising impregnating an oil-soluble dye into the particles grown with the aid of a solvent and, after the impregnation, removing the solvent, or 4) a method comprising covering the particles grown with a colorant by spray-drying or other technique. These coloring methods and colorants have been described for illustrative purposes only and are not intended to be limiting.

The present invention is now illustrated in greater detail with reference to the following Examples and Comparative Examples, but it should be understood that the present invention is not deemed to be limited thereto. In these examples, all the percents are by weight unless otherwise indicated.

The polymerization of the following Examples was carried out by the use of a 5 - liter glass-lined autoclave equipped with an inlet for introducing nitrogen, an anchor agitator, and a temperature controller.

EXAMPLE 1

3.2 l of distilled water was put in a reactor. After displacing the atmosphere with nitrogen, the temperature was increased to 50° C. An aqueous solution consisting of 4.32 g of a compound of formula

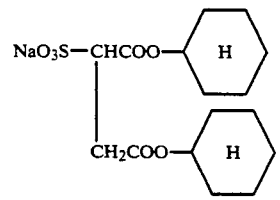

("Pelex CS" produced by Kao Co., Ltd.), 0.72 g of an acrylic acid-maleic acid copolymer (produced by Kao Co., Ltd.; viscosity: 520 poise), and 0.2 ( of water was added thereto.

An aqueous solution of 28.8 g of ammonium persulfate in 0.2 l of water was then added to the mixture 400 ml of styrene and 0.6 g of cupric sulfate (CuSO₄) were further added thereto to effect polymerization for 4 hours while maintaining the temperature at 50° C. Then, a mixture of 400 ml of styrene and 12 g of t-dodecylmercaptan was added dropwise to the reaction mixture from a dropping funnel over a period of about 2 hours. The reaction was further continued at 60° C. for an additional 20 hours to complete polymerization. The resulting polymer particles were found to have a particle size of 2.8 μm under a scanning electron microscope, proving monodispersed fine polymer particles were produced. The standard deviation of size distribution of the polymer particles was determined by means of a Coulter counter and was found to be 1.16. The polymer had a weight average molecular weight of 72,000, a number average molecular weight of 14,000, and a glass transition point of 98.5° C. (yield: 84%).

EXAMPLE 2

1080 ml of styrene and 120 ml of 2-ethylhexyl acrylate were polymerized through two-stage addition in the same manner as in Example 1, except that the ammonium persulfate was replaced with 46.8 g of potassium persulfate and the amount of cupric sulfate was changed to 0.72 g. The polymerization reaction was carried out at 50° C. for 24 hours and then at 65° C. for 12 hours.

The resulting polymer particles were found to have a particle size of 5.9 μm by the same techniques used in Example 1, proving monodispersed polymer particles were produced. The standard deviation in size distribution was 1.17, as measured by the use of a Coulter counter. The polymer had a weight average molecular weight of 220,400, a number average molecular weight of 30,200, and a glass transition point of 61.5° C. (yield: 78%).

EXAMPLE 3

Polymerization of styrene was carried out in the same manner as in Example 1, except for replacing Pelex CS with 5.40 g of a compound of formula $$NaO_3S-CHCOOC_4H_9(n)$$
$$|$$
$$CH_2COOC_4H_9(n)$$

("Pelex BB" produced by Kao Co., Ltd.), replacing the ammonium persulfate with 46.8 g of potassium persulfate, and changing the amount of the cupric sulfate to 0.72 g. The polymerization reaction was performed at 50° C. for 24 hours and then at 65° C for 12 hours.

The resulting polymer particles had a particle size of 1.5 μm, a standard deviation in size distribution of 1.14, a weight average molecular weight of 27,600, a number average molecular weight of 49,000, and a glass transition point of 99.5° C. (yield: 81%).

COMPARATIVE EXAMPLE 1

The same procedure as in Example 1 was followed, except for replacing Pelex CS with a compound of formula $$NaO_3S-CHCOOC_{13}H_{27}$$
$$|$$
$$CH_2COOC_{13}H_{27}$$

The resulting polymer particles had a particle size of 0.25 μm.

COMPARATIVE EXAMPLE 2

The same procedure as in Example 1 was repeated, except for replacing Pelex CS with sodium dodecylsulfate.

The resulting polymer particles had a particle size of 0.40 μm.

EXAMPLE 4

3.2 l of distilled water was put in a reactor. After displacing the atmosphere with nitrogen, the temperature was increased to 50° C. An aqueous solution consisting of 4.32g of a compound of formula

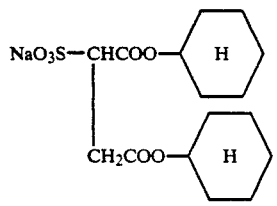

0.72 g of an acrylic acid-maleic acid copolymer (produced by Kao Co., Ltd.; viscosity: 520 poise), and 0.2 l of water was added thereto.

An aqueous solution of 28.8 g of ammonium persulfate in 0.2 ( of water was then added to the mixture. 400 ml of styrene and 0.6 g of cupric sulfate were further added thereto to effect polymerization for 4 hours while maintaining the temperature at 50° C. Thereafter, a mixture of 400 ml of styrene and 20 g of a polydimethylsiloxane macromer ("FM-0700" produced by Chisso Corp.; the compound of formula (II) wherein $R_3$, $R_4$, $R_5$ and $R_6$ each is a methyl group, n is 1, and m is 3) was added dropwise to the reaction mixture, and the reaction was further continued for an additional 40 hours to complete polymerization.

The resulting polymer particles were found to have a particle size of 4.0 μm, a standard deviation in size distribution of 1.14, a weight average molecular weight of 33,600, and a number average molecular weight of 94,000.

EXAMPLE 5

The same procedure as in Example 4 was repeated, except for replacing FM-0700 with a dimethylsiloxane macromer (produced by Chisso Corp.; the compound of formula (III) wherein $R_3$, $R_4$ and $R_6$ each is a methyl group, n is 1 and m is 3).

The resulting polymer fine particles had a particle size of 3.4 μm and a standard deviation in size distribution of 1.14. The polymer particles had a gel form.

EXAMPLE 6

The same procedure as in Example 4 was repeated, except for replacing FM-0700 with a dimethylsiloxane macromer ("FM-0711" produced by Chisso Corp.; the compound for formula (II) where $R_3$, $R_4$, $R_5$ and $R_6$ each is a methyl group, n is 1 and m is 3; average molecular weight: 1000).

The resulting polymer particles had a particle size of 4.2 μm and a standard deviation in size distribution of 1.12. The polymer had a weight average molecular weight of 318,000 and a number average molecular weight of 88,000.

EXAMPLE 7 Preparation of Seed Particles (1st Step)

3.2 l of distilled water was put in a reactor. After displacing the atmosphere with nitrogen, the temperature was increased to 50° C. An aqueous solution consisting of 4.32 g of a compound of formula

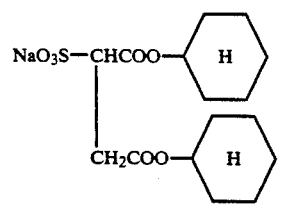

0.72 g of an acrylic acid-maleic acid copolymer (produced by Kao Co., Ltd.; viscosity: 520 poise), and 0.2 l of water was added thereto.

An aqueous solution of 28.8 g of ammonium persulfate in 0.2 l of water was then added to the mixture. Further, ml of styrene and 0.6 g of cupric sulfate were also added thereto to effect polymerization for 5 hours while maintaining the temperature at 50° C. Thereafter, the temperature of the reaction mixture was raised to 60° C. A mixture of 400 ml of styrene and 12 g of t-dodecylmercaptane was placed in a dropping funnel and added dropwise to the reaction mixture over a period of about 2 hours, and the reaction was further continued for an additional period of time to complete polymerization in a total period of 26 hours. The resulting latex was passed through a metal net of 200 mesh to remove any agglomerates.

Under a scanning electron microscope, the resulting polymer latex was found to be a monodispersed system having a particle size of 2.8 μm. The standard deviation of size distribution was 1.09 as determined by means of a Coulter counter. The polymer had a weight average molecular weight of 72,000 and a number average molecular weight of 14,000.

Seed Polymerization (2nd Step)

The latex as prepared in the 1st step was purified by repeatedly subjecting it to ultrafiltration and concentration to a final volume of 2,700 ml (solid content: 20%). To the concentrated latex was added 0.54 g of sodium ditridecylsulfosuccinate ("Pelex TR" produced by Kao Co., Ltd.), followed by shaking, and the latex was preserved (Latex I).

The following components were charged in the same reactor as used in the first step.

| | |
|---|---|
| Latex I | 125 ml |
| Pelex TR (0.02% aqueous solution) | 2340 ml |
| Potassium iodide | 0.2 g |
| Polyvinyl alcohol ("PVA-203" produced by Kuraray Co., Ltd.; degree of saponification: 92 mol %; degree of polymerization: 300) (10% aqueous solution) | 120 ml |

Separately, an emulsion was prepared from the following formulation and charged in the reactor.

| | |
|---|---|
| Benzoyl peroxide | 12 g |
| Styrene | 120 g |
| Pelex TR (0.02% aqueous solution) | 240 ml |

The mixture was stirred at 30° C. for 15 hours to complete impregnation of the polymerization initiator.

An emulsion for growth of seed particles was prepared from the following formulation and added to the reaction mixture.

| | |
|---|---|
| Styrene | 455 g |
| Pelex Tr (0.02% aqueous solution) | 800 ml |
| Pelex OTP (sodium dioctylsulfosuccinate produced by Kao Co., Ltd.) | 7.2 g |

After the addition, the mixture was heated to 75° C. to effect polymerization for 9 hours. The resulting latex was passed through a metal net of 100 mesh to remove any agglomerates from the latex. The agglomerates weighed 10 to 20 g, indicating fairly satisfactory polymerization stability.

When a part of the resulting latex was solidified by lyophilization to determine the molecular weight by means of "HLC 802A" (produced by Toyo Soda Mfg. Co., Ltd.), the polymer was found to have a weight average molecular weight of 56,400 and a number average molecular weight of 21,600. When another part of the latex was taken out and observed under a scanning electron microscope, the polymer particles were found to have a particle diameter of 7.5 μm. The standard deviation in size distribution was 1.10 as determined by means of a Coulter counter.

According to the present invention, monodispersed fine polymer particles having a large number average particle size ranging from about 1.0 to 10.0 μm and a narrow particle size distribution with a standard deviation of not more than 1.25 can be obtained easily by emulsion polymerization without requiring complicated steps.

Further, monodispersed fine polymer particles having a very large number average particle size ranging from 2.0 to 50.0 μm and a narrow particle size distribution with a standard deviation of not more than 1.25 can be obtained easily with good economy by seed polymerization using the above-described monodispersed polymer particles as seed particles.

The polymer fine particles produced by the present invention are useful as biological carriers, carriers for fixed enzymes, carriers for immunohematological diagnostic agents, carriers for drug administration, ion exchange resins, spacers for liquid crystal display elements, fillers for columns, electrophotographic developers, coatings, and the like. In particular, colored fine polymer particles are advantageous in that they can be utilized as electrophotographic developers.

While the invention has been described in detail and with reference to specific embodiments thereof, it will be apparent to one skilled in the art that various changes and modifications can be made therein without departing from the spirit and scope thereof.

What is claimed is:

1. A process for producing monodispersed fine particles of a vinyl polymer, comprising:
   (i) a first step of emulsion polymerizing at least one monomer comprising a vinyl monomer selected from the group consisting of aromatic vinyl compounds, acrylic esters, and methacrylic esters in the presence of:
   (1) a surface active agent represented by formula (I)

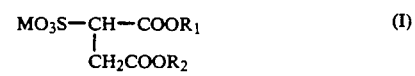

wherein $R_1$ and $R_2$ each represents a substituted or unsubstituted alkyl group having from 4 to 8 carbon atoms, a substituted or unsubstituted phenyl group, or a substituted or unsubstituted cyclohexyl group, and M represents an alkali metal;
   (2) from $10^{-3}$ to $10^{-1}$ mol/l of persulfate as a polymerization initiator; and
   (3) from $10^{-3}$ to $10^{-2}$ mol/l of a divalent metal sulfate as an electrolyte, to form a reaction mixture of monodispersed particles; and
   (ii) a second step of adding at least on monomer comprising a vinyl monomer selected from the group consisting of aromatic vinyl compounds, acrylic esters, and methacrylic esters dropwise to the reaction mixture to facilitate growth of said particles.

2. The process as claimed in claim 1, wherein said surface active agent is a compound represented by the following formula $$NaO_3S-CHCOOC_4H_9$$
$$|$$
$$CH_2COOC_4H_9$$

or a compound represented by the following formula

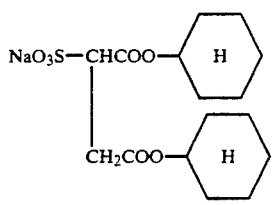

3. The process as claimed in claim 1, wherein said surface active agent is present at a concentration ranging from 0.04 to 0.80 g/dl.

4. The process as claimed in claim 1, wherein said monomer contains a silicon-containing vinyl compound in an amount ranging from 0.1 to 40% by weight based on the total weight of the vinyl monomer and the silicon-containing vinyl compound.

5. The process as claimed in claim 4, wherein said silicon-containing vinyl compound is a compound represented by formula (II)

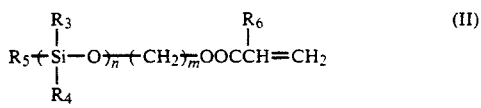

or a compounds represented by formula (III)

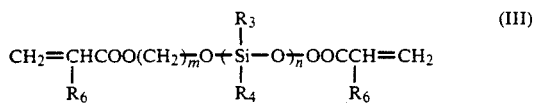

wherein $R_3$, $R_4$, and $R_5$ each represents a hydrogen atom, an alkyl group having from 1 to 8 carbon atoms, or a phenyl group; $R_6$ represents a hydrogen atom or a methyl group; and m an n each represents an integer of from 1 to 10.

6. The process as claimed in claim 1, wherein said persulfate as a polymerization initiator is selected from the group consisting of potassium persulfate and ammonium persulfate.

7. The process as claimed in claim 1, wherein said polymerization is carried out at a temperature ranging from 40° C. to 90° C.

8. The process as claimed in claim 1, wherein said polymerization is carried out at a temperature ranging from 45° C. to 75° C.

9. The process as claimed in claim 1, wherein fine polymer particles are produced have a number average particle size ranging from 1.0 to 10.0 μm and a size distribution with a standard deviation less than or equal to 1.25.

10. The process as claimed in claim 9, further comprising impregnating the resulting fine polymer particles as seed particles with a polymerization initiator and polymerizing at least one vinyl monomer to allow the seed particles to grow.

11. The process as claimed in claim 10, wherein said seed particles are allowed to grow to have a number average particle size of from 2.0 to 50.0 μm with a standard deviation of not more than 1.25.

12. The process as claimed in claim 10, wherein said seed particles to be impregnated have a number average molecular weight of less then 50,000.

13. The process as claimed in claim 10, wherein said polymerization initiator is selected from the group consisting of lauroyl peroxide, m-toluoyl peroxide, trimethylhexanoyl peroxide, and benzoyl peroxide.

14. The process as claimed in claim 19, wherein said polymerization initiators are present in an amount ranging from 0.001 to 10 parts per 100 parts of vinyl monomer, by weight.

15. The process as claimed in claim 10, wherein said impregnation is carried out, in the presence of a surface active agent having a surface tension of not more than 35 dyn/cm.

16. The process as claimed in claim 15, wherein said surface active agent is selected from the group consisting of compounds represented by formulae (IV) and (V)

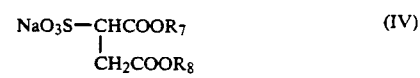

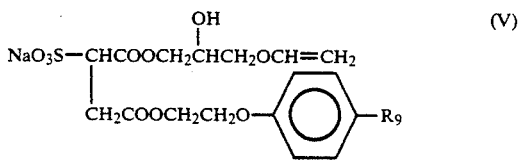

wherein $R_7$, $R_8$, and $R_9$ each represents an alkyl group having from 9 to 20 carbon atoms.

17. The process as claimed in claim 15, wherein said surface active agent is a compound represented by the formula $$NaO_3S-CHCOOC_{13}H_{27}$$
$$|$$
$$CH_2COOC_{13}H_{27}.$$

18. The process as claimed in claim 10, wherein said impregnation is carried out in the presence of polyvinyl alcohol having a degree of saponification ranging from 80 to 95 mol % and a degree of polymerization ranging from 100 to 900 as a dispersion stabilizer.

19. The process according to claim 1, wherein said monomer is added with t-dodecylmercaptan.

20. The process according to claim 1, wherein at least one monomer from steps (i) and (ii) are identical.

21. The process according to claim 1, wherein at least one monomer from steps (i) and (ii) are different.

22. The process according to claim 1, wherein the vinyl monomer used in the first step and the vinyl monomer used in the second step are the same or different, are selected from the group consisting of styrene, α-methylstyrene, p-methylstyrene, p-tert-butylstyrene, p-methoxystyrene, p-phenylstyrene, 3,4-dichlorostyrene, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate, and are optionally combined with a silicon-containing vinyl monomer.

* * * * *

UNITED STATES PATENT AND TRADEMARK OFFICE
CERTIFICATE OF CORRECTION

PATENT NO. : 5,219,943
DATED : June 15, 1993
INVENTOR(S) : Yutaka Akasahi et al.

It is certified that error appears in the above-indentified patent and that said Letters Patent is hereby corrected as shown below:

Claim 1, column 12, line 58, change "$10^{-3}$" to --$10^4$--.

Claim 1, column 12, line 61, change "on" to --one--.

Claim 5, column 13, line 44, change "m an n" to --m and n--.

Claim 14, column 14, line 8, change "claim 19" to --claim 10--.

Claim 20, column 14, line 48, change "are" to --is--.

Claim 21, column 14, line 50, change "are" to --is--.

UNITED STATES PATENT AND TRADEMARK OFFICE
CERTIFICATE OF CORRECTION

PATENT NO. : 5,219,943

DATED : June 15, 1993

INVENTOR(S) : Yutaka Akasahi et al

It is certified that error appears in the above-indentified patent and that said Letters Patent is hereby corrected as shown below:

Claim 21, column 14, line 50, change "are" to --is--.

Signed and Sealed this

Thirty-first Day of May, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,219,943
DATED : June 15, 1993
INVENTOR(S) : Yutaka Akasahi et al.

It is certified that error appears in the above-indentified patent and that said Letters Patent is hereby corrected as shown below:

Claim 5, column 13, line between Formula (II) and Formula (III) change " a compounds" to --a compound --.

Signed and Sealed this

Sixth Day of September, 1994

Attest:

BRUCE LEHMAN

*Attesting Officer*        *Commissioner of Patents and Trademarks*